United States Patent
Udvardy et al.

(10) Patent No.: US 11,358,573 B2
(45) Date of Patent: Jun. 14, 2022

(54) METHOD AND DEVICE FOR CONTROLLING A PARKING BRAKE

(71) Applicant: KNORR-BREMSE SYSTEME FÜR NUTZFAHRZEUGE GMBH, Munich (DE)

(72) Inventors: Oliver Udvardy, Budapest (HU); Peter Kerner, Tata (HU)

(73) Assignee: Knorr-Bremse Systeme fuer Nutzfahrzeuge GmbH, Munich (DE)

(*) Notice: Subject to any disclaimer, the term of this patent is extended or adjusted under 35 U.S.C. 154(b) by 244 days.

(21) Appl. No.: 16/646,859

(22) PCT Filed: Sep. 13, 2018

(86) PCT No.: PCT/EP2018/074823
§ 371 (c)(1),
(2) Date: Mar. 12, 2020

(87) PCT Pub. No.: WO2019/057614
PCT Pub. Date: Mar. 28, 2019

(65) Prior Publication Data
US 2021/0009092 A1    Jan. 14, 2021

(30) Foreign Application Priority Data
Sep. 19, 2017   (DE) .................. 10 2017 121 686.3

(51) Int. Cl.
*B60T 7/12* (2006.01)
*B60T 13/74* (2006.01)
*B60T 8/74* (2006.01)

(52) U.S. Cl.
CPC ............ *B60T 7/12* (2013.01); *B60T 13/741* (2013.01); *B60T 8/74* (2013.01); *B60T 2201/10* (2013.01)

(58) Field of Classification Search
CPC ...... B60T 8/74; B60T 13/741; B60T 2201/10; B60T 7/12
(Continued)

(56) References Cited

U.S. PATENT DOCUMENTS 5,474,370 A   12/1995 Ravndal
2003/0033073 A1   2/2003 Kichima et al.
(Continued)

FOREIGN PATENT DOCUMENTS

AU   2012203850 B2 *  4/2015   ............. B61C 17/12
CN   102431530 A *  5/2012
(Continued)

OTHER PUBLICATIONS

International Search Report dated Jan. 25, 2019 of the corresponding International Application PCT/EP2018/074823.

*Primary Examiner* — Atul Trivedi
(74) *Attorney, Agent, or Firm* — Norton Rose Fulbright US LLP; Gerard Messina; Aaron Deditch (57) ABSTRACT

A method for controlling a parking brake of a vehicle, including: receiving an activation signal which represents a manual operating unit of a parking brake being activated by a driver; reading a speed decrease signal which represents a value of a speed decrease of the vehicle upon receiving the activation signal; and emitting a delay signal as a function of the value of the speed decrease, wherein the delay signal is configured for delaying a complete engagement of the parking brake. Also described are a related apparatus/device, and a computer readable medium.

16 Claims, 4 Drawing Sheets

(58) Field of Classification Search
USPC .......................................................... 701/7
See application file for complete search history.

(56) References Cited

U.S. PATENT DOCUMENTS

| | | | |
|---|---|---|---|
| 2004/0140710 A1 | 7/2004 | Alvarez et al. | |
| 2006/0232126 A1 | 10/2006 | Giers et al. | |
| 2008/0086252 A1* | 4/2008 | Nakayama ............... | B60T 7/122 701/80 |
| 2008/0087509 A1* | 4/2008 | Kal ........................... | B60T 7/12 701/70 |
| 2009/0099746 A1* | 4/2009 | Hilberer .................. | B60T 7/107 701/70 |
| 2010/0250062 A1* | 9/2010 | Desfriches ............... | B60T 7/122 701/36 |
| 2011/0004386 A1* | 1/2011 | Kinder .................... | B60T 8/885 701/70 |
| 2011/0012421 A1 | 1/2011 | Bensch et al. | |
| 2012/0018240 A1* | 1/2012 | Grubaugh ................. | B62D 51/02 701/70 |
| 2013/0175124 A1 | 7/2013 | Tomczak et al. | |
| 2019/0031162 A1 | 1/2019 | Besier et al. | |
| 2019/0270381 A1* | 9/2019 | Washio .................. | B60K 17/35 |
| 2020/0180586 A1* | 6/2020 | Taneyhill ............... | B60T 13/686 |

FOREIGN PATENT DOCUMENTS

| | | | | |
|---|---|---|---|---|
| CN | 102729966 A | | 10/2012 | |
| CN | 103253257 A | | 8/2013 | |
| CN | 105501212 A | | 4/2016 | |
| CN | 107054336 A | * | 8/2017 | ............ B60K 37/02 |
| DE | 199 42 533 A1 | | 11/2000 | |
| DE | 102005037965 A1 | * | 5/2006 | ............ B60T 13/746 |
| DE | 60 2004 000 867 T2 | | 10/2006 | |
| DE | 10 2008 009 882 A1 | | 8/2009 | |
| DE | 102008009882 A1 | * | 8/2009 | ............ B60T 13/385 |
| DE | 102008018946 A1 | * | 10/2009 | ............ B60T 7/122 |
| DE | 10 2008 018 622 | | 11/2009 | |
| DE | 10 2014 118 943 A1 | | 10/2015 | |
| DE | 10 2015 212 109 A1 | | 1/2017 | |
| DE | 10 2016 202 715 A1 | | 8/2017 | |
| EP | 2517936 A2 | * | 10/2012 | ............ B60T 7/042 |
| FR | 2920376 A1 | * | 3/2009 | ............ B60T 7/122 |
| FR | 2995832 A1 | * | 3/2014 | ............ B60K 6/26 |
| WO | 2004/054862 A1 | | 7/2004 | |
| WO | WO-2006013174 A1 | * | 2/2006 | ................ B60T 1/12 |
| WO | WO-2006024601 A1 | * | 3/2006 | ............ B60T 13/746 |
| WO | WO-2009086855 A1 | * | 7/2009 | ............ B60T 13/26 |
| WO | WO-2009103330 A1 | * | 8/2009 | ............ B60T 13/385 |
| WO | 2014021311 A1 | | 2/2014 | |
| WO | WO-2014173605 A1 | * | 10/2014 | ............ B60T 13/741 |
| WO | WO-2017001546 A1 | * | 1/2017 | ............ B60T 13/662 |
| WO | WO-2019119957 A1 | * | 6/2019 | ............ B60R 16/023 |

* cited by examiner

METHOD AND DEVICE FOR CONTROLLING A PARKING BRAKE

FIELD OF THE INVENTION

The present invention relates to a method and to a device for controlling a parking brake.

BACKGROUND INFORMATION

Parking brake systems, also electronic parking brake systems, usually do not have any anti-blocking function. When a driver operates the parking brake as an auxiliary brake or emergency brake, it can arise in particular on a low-friction hard surface that one or a plurality of wheels block. Since the parking brake in the case of commercial vehicles often acts on all wheels, it is possible that all wheels of the vehicle block in the situation described. In this case, this can result in difficulties or inaccuracies when judging the vehicle travel state. Electronic parking brakes can typically be manually released by the driver when the brake pedal is depressed.

SUMMARY OF THE INVENTION

Against this background, it is the object of the present approach to achieve an improved method for controlling a parking brake and an improved device for controlling a parking brake.

This object may be achieved by a method and by a device for controlling a parking brake according to the descriptions herein.

A method for controlling a parking brake of a vehicle comprises a step of receiving, a step of reading, and a step of emitting. In the step of receiving an activation signal which represents a manual operating unit of a parking brake being activated by a driver is received. In the step of reading a speed decrease signal which represents a value of a speed decrease of the vehicle upon receiving the activation signal is received. In the step of emitting a delay signal as a function of the value of the speed decrease is emitted, said delay signal being configured for delaying a complete engagement of the parking brake. Emptying of a parking brake chamber, for example of a parking brake cylinder, can be delayed on account of the delay signal, for example.

The vehicle can be a commercial vehicle, for example a truck, or a vehicle for conveying passengers, for example a bus or a passenger automobile. A method proposed here enables the complete engagement of the parking brake to be delayed when the driver of the vehicle activates a manual operating installation of the parking brake, for example during an emergency braking maneuver. The driver in such an emergency braking situation is thus offered the opportunity of stabilizing the vehicle before the wheels potentially block on account of the complete engagement of the parking brake.

The method can also comprise a further step of reading in which a motion signal which represents a motion state of the vehicle is read, wherein the step of emitting can be carried out in response to the step of the further reading. The motion state is to be understood as a moving state of the vehicle in which a travel speed of the vehicle is more than 0 km/h.

In the step of emitting the delay signal can be emitted when the value of the speed decrease exceeds a limit value. The method can be adapted to various vehicle types or loading states by way of the limit value, for example. It can be ensured by way of the limit value that the driver is then offered the possibility of cancelling or preventing the engagement of the parking brake, for example when this is expedient in order for the vehicle to be stabilized. The limit value can be predetermined and thus define a predetermined speed decrease, or specify a decrease of a reference speed. The limit value can be used for comparative purposes. The value of the speed decrease, and correspondingly the limit value, can represent a gradient, a rate of increase/decrease, or a derivation, of the speed decrease, for example.

It is advantageous for the step of emitting to be terminated when a standstill signal which represents a standstill of the vehicle is read. The standstill signal herein can indicate a standstill or blocking of at least one of the wheels of the vehicle. The blocking of a wheel can also arise while the vehicle is still in motion. In this case, the standstill signal can erroneously indicate the standstill of the vehicle.

It is furthermore advantageous for the step of emitting to be terminated after a predetermined temporal period. This temporal period can be utilized as a time window for the driver so as to intervene in the complete engagement of the parking brake. The complete engagement of the parking brake can be enabled if the driver remains inactive during this time.

Consequently, the method can comprise a step of further emitting a parking brake signal, in which a parking brake signal which is configured for causing the complete engagement of the parking brake in response to the termination of the emitting is emitted.

The method can comprise a step of transmitting in which a release signal is transmitted. The release signal can be configured for releasing the parking brake when a further activation signal which represents the manual operating unit being released by the driver is received within a predetermined time upon emitting the parking brake signal. The driver is thus enabled to release the parking brake even upon the engagement of the latter, so as to stabilize the vehicle. According to one embodiment herein, it is not necessary that the driver to this end simultaneously activates a further pedal, usually the brake pedal.

Additionally or alternatively, the method can comprise a step of further transmitting in which a release signal is transmitted. The release signal can again be configured for releasing the parking brake. The release signal herein can be transmitted when a further activation signal which represents the manual operating unit being released by the driver while the delay signal is being emitted is received.

In order to ensure that the parking brake engages, for example when the driver does not activate the manual operating unit in an emergency braking situation but for actually blocking the wheels, the method can comprise a step of additional emitting in which a parking brake signal which is configured for causing the complete engagement of the parking brake is emitted. The parking brake signal can be emitted in response to the activation signal and a standstill signal which represents a standstill of the vehicle.

The approach proposed here furthermore achieves a device which is specified for carrying out, actuating, or implementing, respectively, the steps of a variant of a method proposed here in corresponding installations. The object on which the approach is based can be achieved in a rapid and efficient manner also by way of this variant of embodiment of the approach in the form of a device.

To this end, the device can have at least one computing unit for processing signals or data, at least one storage unit for storing signals or data, at least one interface to a sensor or an actuator for reading sensor signals from the sensor or for emitting data signals or control signals to the actuator, and/or at least one communications interface for reading or emitting data which is embedded in a communication protocol. The computing unit can be, for example, a signal processor, a microcontroller, or the like, wherein the storage unit can be a flash memory, an EPROM, or a magnetic storage unit. The communications interface can be configured for reading or emitting data in a wireless and/or wire-bound manner, wherein a communications interface which can read or emit wire-bound data can read said data, for example electrically or optically, from a corresponding data transmission line, or emit said data to a corresponding data transmission line.

A device herein can be understood to be an electrical apparatus which processes sensor signals and, as a function thereof, emits control signals and/or data signals. The device can have an interface which is configured as hardware and/or software. In the case of a configuration as hardware, the interfaces can be, for example, part of a so-called system ASIC which includes the most varied functions of the device. However, it is also possible for the interfaces to be dedicated integrated circuits, or to at least in part be composed of discrete components. In the case of a configuration as software, the interfaces can be software modules which are present, for example, on a microcontroller, alongside other software modules.

Exemplary embodiments of the approach proposed here will be explained in more detail in the description hereunder with reference to the figures.

DETAILED DESCRIPTION

Figure 1:
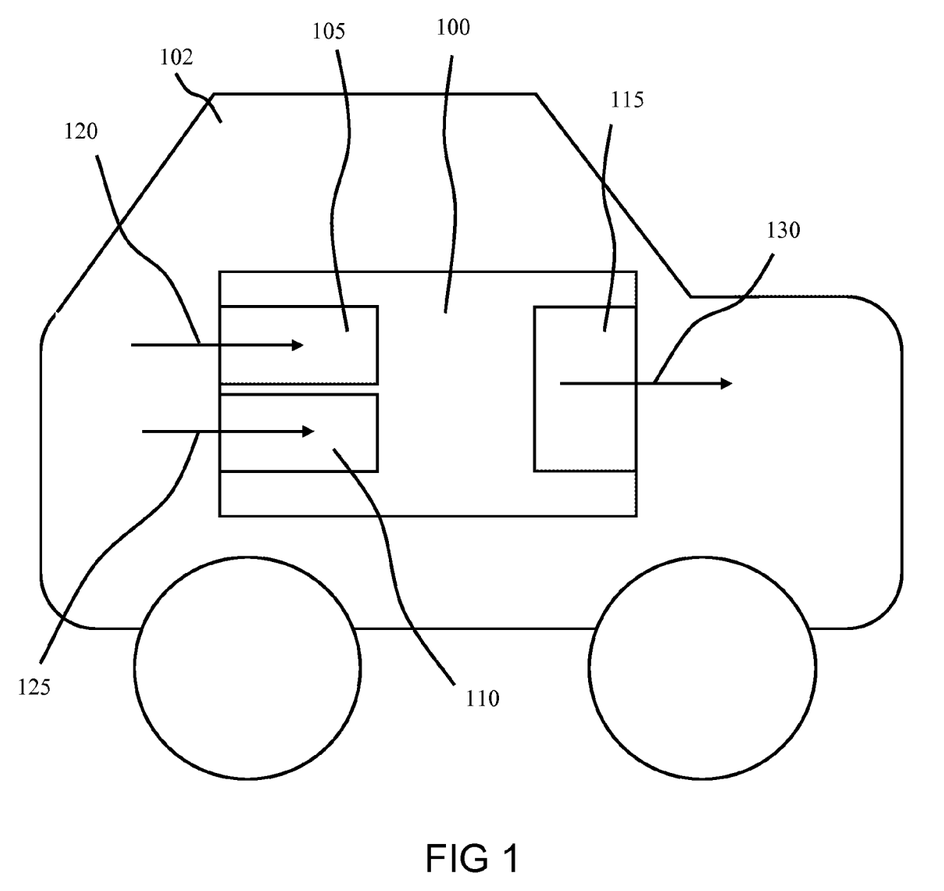
FIG. 1 shows a schematic illustration of a device for controlling a parking brake of a vehicle, according to one exemplary embodiment.

FIG. 1 shows a schematic illustration of a device 100 for controlling a parking brake of a vehicle 102, according to one exemplary embodiment.

According to this exemplary embodiment, the device 100 is received in the vehicle 102. The device 100 has a receiving installation 105, a reading installation 110, and an emitting installation 115.

The receiving installation 105 is configured for receiving an activation signal 120 which represents a manual operating unit of a parking brake being activated by a driver. In an exemplary manner, the activation signal 120 is provided by a sensor that is coupled to the manual operating unit.

The reading installation 110 is configured for reading a speed decrease signal 125 which represents a value of a speed decrease of the vehicle 102 upon receiving the activation signal 120. In an exemplary manner, the speed decrease signal 125 is provided by a sensor which monitors a rotating speed of at least one of the wheels of the vehicle on which the parking brake acts. The speed decrease signal 125 can also be provided by an evaluation installation which monitors the speed of the vehicle based on sensor data.

The emitting installation 115 is configured for emitting a delay signal 130 as a function of the value of the speed decrease, said delay signal 130 being configured for delaying a complete engagement of the parking brake. To this end, the delay signal 130 can be emitted, for example, to a control unit assigned to the parking brake, or to an actuator of the parking brake.

Figure 2:
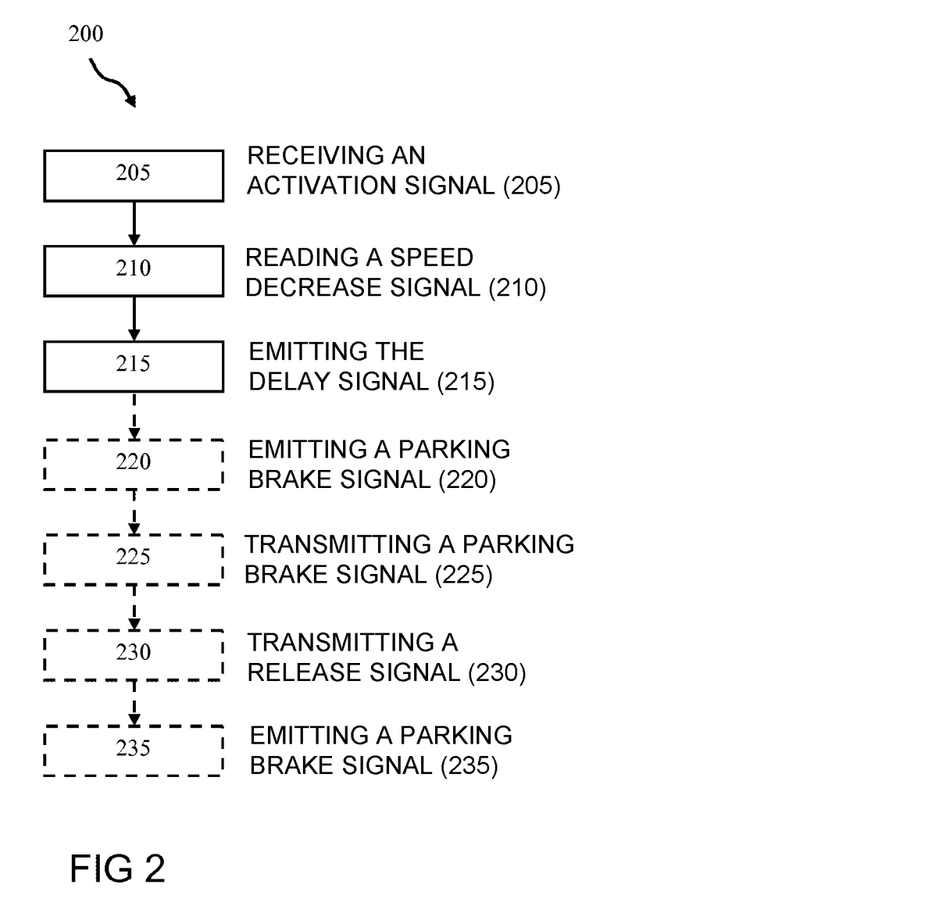
FIG. 2 shows a flowchart of a method for controlling a parking brake of a vehicle, according to one exemplary embodiment.

FIG. 2 shows a flowchart of a method 200 for controlling a parking brake of a vehicle, according to one exemplary embodiment. The method 200 herein can be a method which is able to be carried out and/or actuated by the device described in FIG. 1.

The method comprises at least a step 205 of receiving, a step 210 of reading, and a step 215 of emitting. In the step 205 of receiving, an activation signal which represents the manual operating unit of a parking brake being activated by a driver is received. In the step 210 of reading, a speed decrease signal which represents a value of a speed decrease of the vehicle upon receiving the activation signal is read. In the step 215 of emitting, a delay signal as a function of the value of the speed decrease is emitted, said delay signal being configured for delaying a complete engagement of the parking brake.

According to this exemplary embodiment, in the step 215 of emitting, the delay signal is emitted when the value of the speed decrease, for example in absolute terms, exceeds a limit value.

The step 215 of emitting the delay signal according to one exemplary embodiment is terminated when a standstill signal which represents a standstill of the vehicle is read. The standstill signal herein can also indicate only the blocking of a wheel, such that the standstill represented by the standstill signal according to one exemplary embodiment is not an actual standstill of the vehicle. Additionally or alternatively, the step 215 of emitting is terminated after a predetermined temporal period. It can be prevented in this way that the effect of the parking brake is excessively delayed.

The method 200 according to this exemplary embodiment optionally moreover comprises a step 220 of further emitting, a step 225 of transmitting, a step 230 of further transmitting, and a step 235 of additional emitting.

In the step 220 of further emitting, a parking brake signal which is configured for causing the complete engagement of the parking brake when the step 215 of emitting the delay signal is terminated is emitted. It can thus be ensured that the full braking effect of the parking brake is made available after the delay has been carried out.

In the step 225 of transmitting, a release signal which is configured for releasing the parking brake again when a further activation signal which represents the manual operating unit being released by the driver is received within a predetermined time upon emitting the parking brake signal is transmitted. The driver thus once again has the possibility of releasing the parking brake, even after the delay has already taken place.

In the step 230 of further transmitting, a release signal which is configured for releasing the parking brake when a further activation signal which represents the manual operating unit being released by the driver is received while the delay signal is being emitted is transmitted. The driver can thus release the parking brake early again, in particular during a temporal period in which the parking brake does not yet completely engage by virtue of the delay.

In the step 235 of additional emitting, a parking brake signal which is configured for causing the complete engagement of the parking brake in response to the activation signal and a standstill signal which represents an actual standstill of the vehicle is emitted. In this case, no delay in the breaking effect of the parking brake is required, since the vehicle is in a parked position, for example.

The method steps proposed here can be carried out repeatedly as well as in a sequence which differs from that described here.

Figure 3:
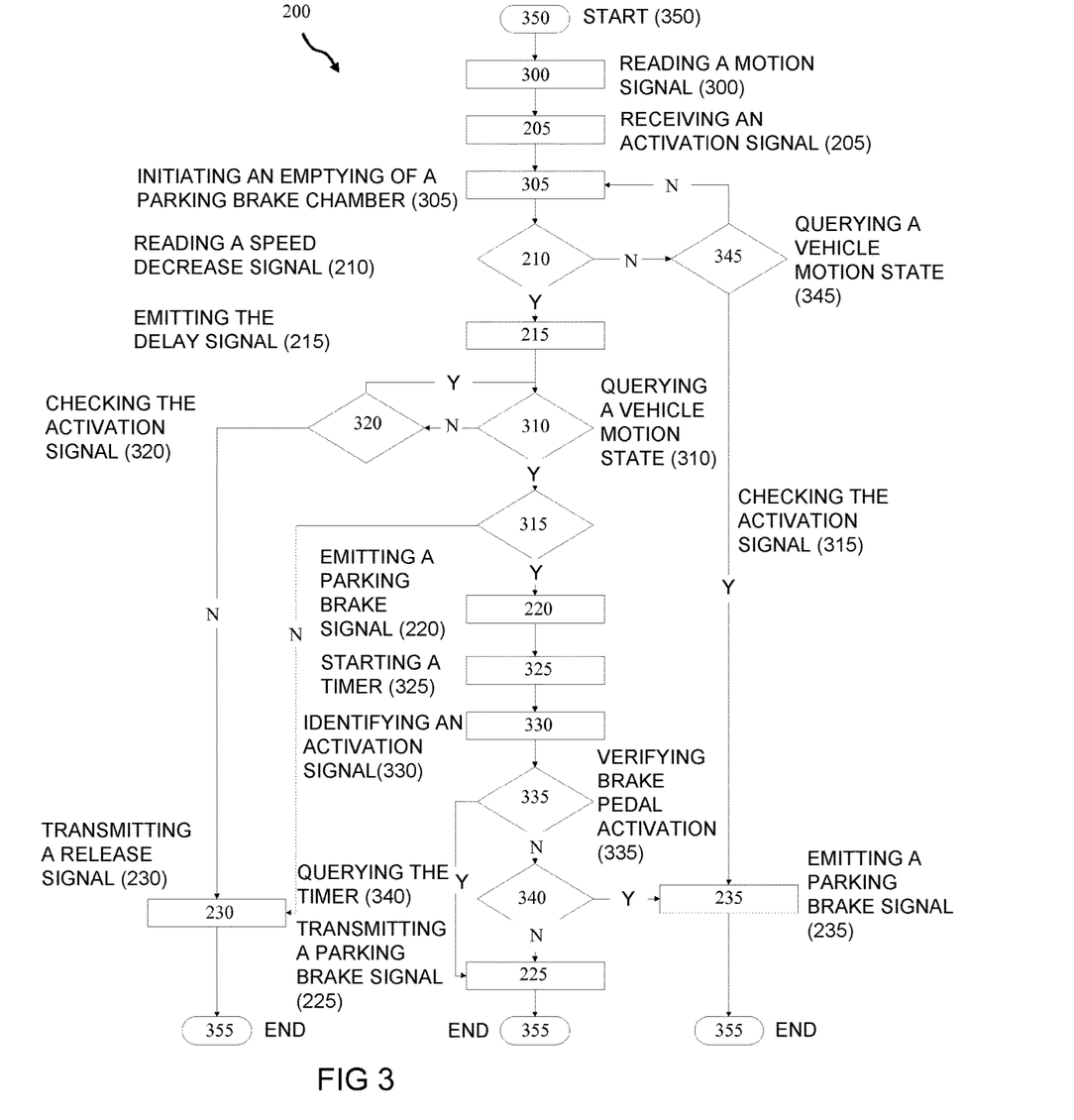
FIG. 3 shows a flowchart of a method for controlling a parking brake of a vehicle, according to one exemplary embodiment.

FIG. 3 shows a flowchart of a method 200 for controlling a parking brake of a vehicle, according to one exemplary embodiment. This herein can be an exemplary embodiment of the method 200 described in FIG. 2, having optional additional steps.

In a step 300 of further reading, a motion signal which represents a motion state of the vehicle is read. In the step 300 of further reading herein, a reference speed of the vehicle which indicates that the vehicle is in motion and is not at a standstill is read. In a step 305 of initiating, emptying of at least one parking brake chamber is initiated. In a step 310 of querying, a motion state of the vehicle is queried. When a standstill signal which represents a standstill of the vehicle is identified in step 310 of querying, a step 315 of checking in which it is checked whether the activation signal is still prevalent, that is to say whether the manual operating unit is still being activated, thus is disposed in an activation position, follows. When a motion signal which indicates that the vehicle is in motion is identified in the step 310 of querying, a step 320 of further checking, in which it is checked whether the activation signal is still prevalent, that is to say whether the manual operating unit is still being activated, thus is disposed in an activation position, follows. The step 310 of querying follows when the activation signal is still prevalent. When the activation signal is no longer prevalent, or the further activation signal which represents the manual operating unit being released by the driver is read, the step 230 of further transmitting is carried out, and the parking brake is released.

When it is identified in step 315 of checking that the activation signal is still prevalent, the step 220 of further emitting is carried out and a complete engagement of the parking brake is caused. When it is identified in the step 315 of checking that the activation signal is no longer prevalent, the step 230 of further transmitting is carried out, and the parking brake is released.

In a step 325 of starting a timer for a predetermined timer running time is started. In a step 330 of identifying a further activation signal which represents the manual operating unit being released by the driver is identified. In a step 335 of verifying it is verified whether a brake pedal is activated by the driver. When the brake pedal is activated, the step 225 of emitting follows, and the parking brake is released. When the brake pedal is not activated, a step 340 of further querying the predetermined timer running time is performed. When the timer running time has elapsed, the step 235 of additional emitting follows, and a complete engagement of the parking brake is caused. When the timer running time has not yet elapsed, the step 225 of emitting follows, and the parking brake is released.

When in step 210 a speed decrease signal which represents a value of a speed decrease of the vehicle upon receiving the activation signal is read, in which the value under shoots the limit value described in FIG. 2, a step 345 of additional querying in which a motion state of the vehicle is queried is carried out. When a standstill signal which represents a standstill of the vehicle is identified in the step 345 of additional querying, the step 235 of additional emitting follows, and the complete engagement of the parking brake is caused. When a motion signal which indicates that the vehicle is in motion is identified in step 345 of additional querying, the step 305 of initiating follows.

A block 350 identifies a start of the method 200. Further blocks 355 identify in each case an end of the method 200.

Exemplary embodiments of the method 200 will be summarized yet again hereunder and described in other words.

The method 200 proposed here can also be referred to as a method for releasing an electronic parking brake in the event of wheel blocking.

In other words, the method 200 can be referred to as a method for delaying a parking brake and for enabling the parking brake to be released while using exclusively a manual operating unit in safety-critical situations. The safety-critical situation according to this exemplary embodiment is a situation in which the wheels of the vehicle are blocked. The complete engagement of the parking brake herein is delayed when a safety-critical situation is identified by way of a particularly high or intensive speed decrease of the vehicle. Once the safety-critical situation has been identified, the complete engagement of the parking brake according to this exemplary embodiment is delayed only by a predetermined temporal period. The releasing of the parking brake is enabled only when the high or intensive speed decrease has been identified before the parking brake completely engages. The releasing of the parking brake is moreover possible only within a defined time window upon complete engagement of the parking brake.

In the known evasive or emergency braking situation, when all wheels are blocked and the driver has completely activated the manual operating unit of the parking brake, it is possible that the parking brake completely engages since all wheels do not show any vehicle speed at all. It is now possible that the driver in such a known situation unsuccessfully attempts to release the parking brake and to stabilize the vehicle in that he/she indeed operates the manual operating unit of the parking brake system without however pressing the brake pedal herein.

The parking brakes must engage in the case of a completely activated manual operating unit and an established motion state of the vehicle which indicates a standstill. In the case of the method 200 proposed here, when a motion state which indicates a standstill of the vehicle has been established, but an identified speed decrease of the vehicle prior to the established standstill exceeds a limit value, the complete engagement of the parking brake is advantageously delayed by a predetermined temporal period so as to enable the driver to stabilize the vehicle by releasing the manual operating unit.

When the speed decrease is more than the limit value, and the driver activates the manual operating unit of the parking brake longer than the predetermined temporal period, the driver is moreover enabled to manually release the parking brake in a defined time window without herein having to depress the brake pedal or any other pedal once the parking brake has been completely activated, such that the driver is enabled to release the parking brake and to reclaim the stability of the vehicle.

Figure 4:
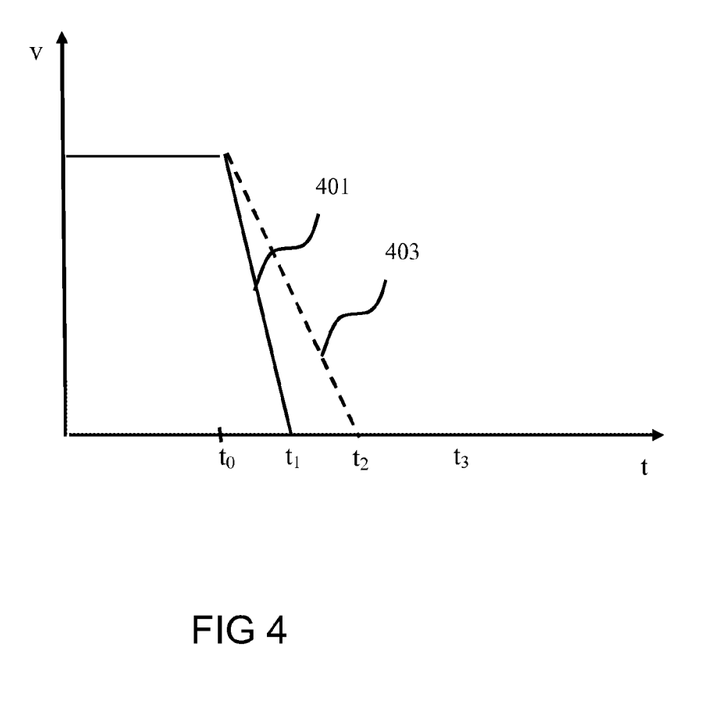
FIG. 4 shows an illustration of a profile of the speed of the vehicle.

FIG. 4 shows a diagram, the time t being plotted on the x-coordinate and the speed of the vehicle being plotted on the y-coordinate of said diagram. Shown is a speed decrease 401 of the vehicle upon the beginning of a braking procedure at the temporal point $t_0$. The beginning of the braking procedure is indicated, for example, by the activation signal already described. The speed decrease 401 is indicated, for example, by the speed decrease signal already described. According to this exemplary embodiment, the speed decrease 401 is more than a predetermined speed decrease 403 which is defined, for example, by way of the already described limit value for the speed decrease 401. Said limit value corresponds, for example, to the gradients or the rate of increase/decrease of the speed decrease 403. The value of the speed decrease 401, for example the gradient of the speed decrease 401, thus exceeds the limit value. With a view to this case, the delay signal already described is emitted according to one exemplary embodiment, by way of which a complete engagement of the parking brake can be delayed. It is thus possible for the driver to release the parking brake after the temporal point $t_1$.

According to one exemplary embodiment, the speed decrease 401 relates to a reference speed as is mentioned by the preceding figures in steps 300, 210, 215, 310. This reference speed is calculated using a suitable algorithm while using all available wheel speed signals. The reference speed is not necessarily equal to any of the measured wheel speeds.

According to one exemplary embodiment, a control unit of the parking brake estimates the speed decrease 401 of the vehicle while using the gradient of the reference speed. When the gradient is more than a predetermined limit, as is used by the preceding figures in step 215, it is thus assumed that the speed decrease of the vehicle is equal to the predetermined limit value instead of the measured speed decrease 401.

According to the exemplary embodiment shown by FIG. 4, the reference speed at the temporal point $t_1$ reaches zero. By way of the approach described here, it is assumed that the vehicle speed at the temporal point $t_2$ becomes zero. The parking brake is released when the driver releases the manual control unit (HCU) of the parking brake between the temporal points $t_1$ and $t_2$.

When the driver releases the manual control unit, for example by removing his/her hand from the manual control unit, between the temporal points $t_1$ and $t_2$, the parking brake according to one exemplary embodiment is thus released or deactivated.

When the driver keeps the manual control unit in the parking position up to the temporal point $t_2$, the parking brake according to one exemplary embodiment is completely established or activated.

With a view to the case of the driver between the temporal points $t_2$ and $t_3$ transferring the manual control unit to a position for releasing the parking brake, according to one exemplary embodiment it is furthermore not necessary for a brake pedal or any other pedal to be depressed in order for the parking brake to be released or to be deactivated.

Releasing or deactivating the parking brake after the temporal point $t_3$ is possible when the driver transfers the manual control unit to the position for releasing the parking brake and additionally depresses the brake pedal or any other pedal provided to this end.

THE LIST OF REFERENCE SIGNS IS AS FOLLOWS

100 Device for controlling a parking brake
102 Vehicle
105 Receiving installation
110 Reading installation
115 Emitting installation
120 Activation signal
125 Speed decrease signal
130 Delay signal
200 Method for controlling a parking brake
205 Step of receiving
210 Step of reading
215 Step of emitting
220 Step of further emitting
225 Step of transmitting
230 Step of further transmitting
235 Step of additional emitting
300 Step of further reading
305 Step of initiating
310 Step of querying
315 Step of checking
320 Step of further checking
325 Step of starting
330 Step of identifying
335 Step of verifying
340 Step of further querying
345 Step of additional querying
350 Block
355 Further block
401 Speed decrease
403 Predefined speed decrease

The invention claimed is:

1. A method for controlling a parking brake of a vehicle, the method comprising:
receiving an activation signal which represents a manual operating unit of a parking brake being activated by a driver;
reading a speed decrease signal which represents a value of a speed decrease of the vehicle upon receiving the activation signal; and
emitting a delay signal as a function of the value of the speed decrease, wherein the delay signal is configured for delaying a complete engagement of the parking brake;
wherein the activation signal is provided by a sensor that is coupled to the manual operating unit,
wherein the speed decrease signal is provided by a sensor which monitors a rotating speed of at least one of the wheels of the vehicle on which the parking brake acts, and/or is provided by an evaluation installation which monitors the speed of the vehicle based on sensor data, and
wherein the delay signal is emitted to a control unit assigned to the parking brake or to an actuator of the parking brake.

2. The method of claim 1, wherein the delay signal is emitted when the value of the speed decrease exceeds a limit value.

3. The method of claim 1, wherein the emitting is terminated when a standstill signal which represents a standstill of the vehicle is read.

4. The method of claim 3, further comprising:
further emitting a parking brake signal which is for causing complete engagement of the parking brake in response to the termination of the emitting.

5. The method of claim 4, further comprising:
transmitting a release signal to release the parking brake when a further activation signal, which represents the manual operating unit being released by the driver, is received within a predetermined time upon emitting the parking brake signal.

6. The method of claim 1, wherein the emitting is terminated after a predetermined temporal period.

7. The method of claim 1, further comprising:
further transmitting a release signal to release the parking brake when a further activation signal, which represents the manual operating unit being released by the driver, while the delay signal is being emitted is received.

8. The method of claim 1, further comprising:
additionally emitting a parking brake signal which is for causing complete engagement of the parking brake in response to the activation signal and a standstill signal which represents a standstill of the vehicle.

9. The method of claim 1, further comprising:
initiating, emptying of at least one parking brake chamber is initiated;
querying a motion state of the vehicle; and
checking, when a standstill signal which represents a standstill of the vehicle is identified the querying, whether the activation signal is still prevalent, so that the manual operating unit is still in an activation position.

10. The method of claim 9, further comprising:
further checking, when a motion signal which indicates that the vehicle is in motion is identified in the querying, whether the activation signal is still prevalent, so that the manual operating unit is still in an activation position, wherein the querying follows when the activation signal is still prevalent, and wherein when the activation signal is no longer prevalent, or the further activation signal which represents the manual operating unit being released by the driver is read, a further transmitting is carried out, and the parking brake is released.

11. The method of claim 10, further comprising:
performing a further emitting, when it is identified in the checking that the activation signal is still prevalent, to cause a complete engagement of the parking brake, and wherein when it is identified in the checking that the activation signal is no longer prevalent, the further transmitting is carried out to release the parking brake.

12. The method of claim 11, further comprising:
starting a timer for a predetermined timer running time;
identifying a further activation signal which represents the manual operating unit being released by the driver;
verifying whether a brake pedal is activated by the driver, wherein when the brake pedal is activated, the emitting is performed to release the parking brake, and wherein when the brake pedal is not activated, further querying the predetermined timer running time, and when the timer running time has elapsed, an additional emitting is performed to cause a complete engagement of the parking brake, and wherein when the timer running time has not yet elapsed, the emitting is performed to release the parking brake.

13. The method of claim 12, wherein when the speed decrease signal which represents a value of a speed decrease of the vehicle upon receiving the activation signal is read, and the value under shoots a limit value, additionally querying a motion state of the vehicle, wherein when a standstill signal which represents a standstill of the vehicle is identified in the additional querying, the additional emitting is performed to cause complete engagement of the parking brake, and wherein when a motion signal which indicates that the vehicle is in motion is identified in the additional querying, the initiating follows.

14. An apparatus for controlling a parking brake of a vehicle, comprising:
a device configured to perform the following:
receiving an activation signal which represents a manual operating unit of a parking brake being activated by a driver;
reading a speed decrease signal which represents a value of a speed decrease of the vehicle upon receiving the activation signal; and
emitting a delay signal as a function of the value of the speed decrease, wherein the delay signal is configured for delaying a complete engagement of the parking brake;
wherein the activation signal is provided by a sensor that is coupled to the manual operating unit,
wherein the speed decrease signal is provided by a sensor which monitors a rotating speed of at least one of the wheels of the vehicle on which the parking brake acts, and/or is provided by an evaluation installation which monitors the speed of the vehicle based on sensor data, and
wherein the delay signal is emitted to a control unit assigned to the parking brake or to an actuator of the parking brake.

15. A non-transitory computer readable medium having a computer software, which is executable by a processor, comprising:
a program code arrangement having program code for controlling a parking brake of a vehicle, by performing the following:
receiving an activation signal which represents a manual operating unit of a parking brake being activated by a driver;
reading a speed decrease signal which represents a value of a speed decrease of the vehicle upon receiving the activation signal; and
emitting a delay signal as a function of the value of the speed decrease, wherein the delay signal is configured for delaying a complete engagement of the parking brake;
wherein the activation signal is provided by a sensor that is coupled to the manual operating unit,
wherein the speed decrease signal is provided by a sensor which monitors a rotating speed of at least one of the wheels of the vehicle on which the parking brake acts, and/or is provided by an evaluation installation which monitors the speed of the vehicle based on sensor data, and
wherein the delay signal is emitted to a control unit assigned to the parking brake or to an actuator of the parking brake.

16. The computer readable medium of claim 15, wherein the delay signal is emitted when the value of the speed decrease exceeds a limit value.

* * * * *